Oct. 30, 1945.   F. R. J. DAVIS   2,387,885
ARMATURE CONSTRUCTION FOR DYNAMO-ELECTRIC MACHINES
Filed March 4, 1943
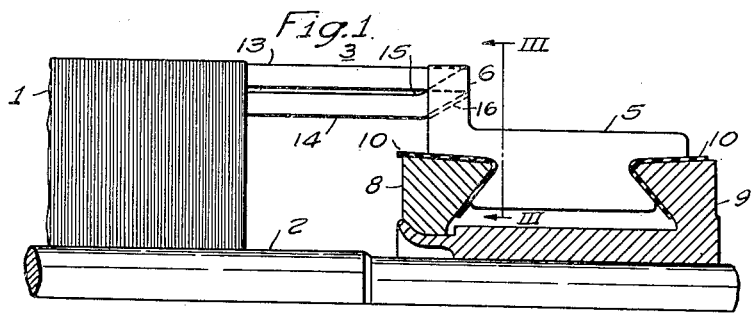
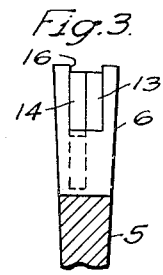
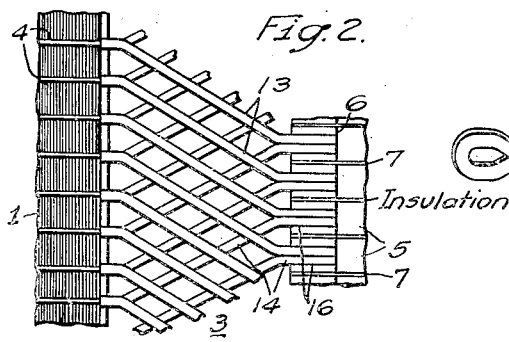
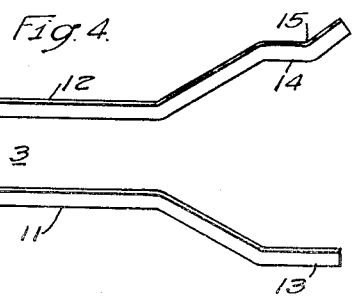
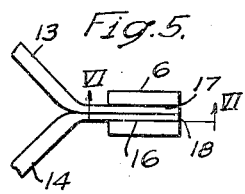
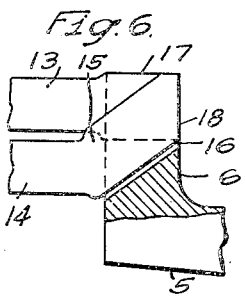
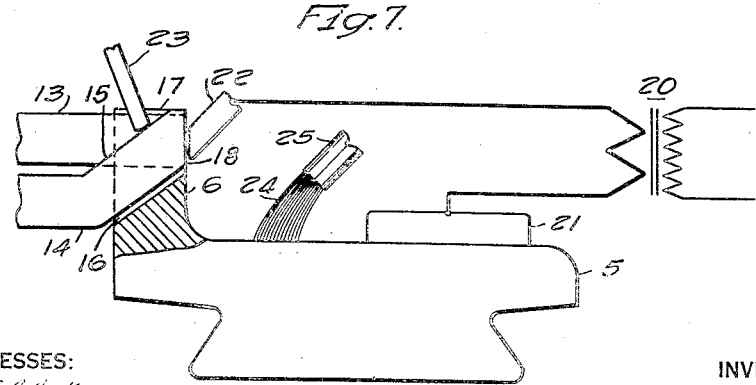
WITNESSES:
INVENTOR
Frederick R. J. Davis.
BY
ATTORNEY Patented Oct. 30, 1945

2,387,885

UNITED STATES PATENT OFFICE 2,387,885

ARMATURE CONSTRUCTION FOR DYNAMO-ELECTRIC MACHINES

Frederick R. J. Davis, Lima, Ohio, assignor to Westinghouse Electric Corporation, East Pittsburgh, Pa., a corporation of Pennsylvania Application March 4, 1943, Serial No. 477,961

5 Claims. (Cl. 171—326)

The present invention relates to the construction of dynamo-electric machines and, more particularly, to an improved armature construction for machines of relatively small size and high capacity.

In the usual construction of commutator-type dynamo-electric machines, such as direct-current generators and motors, the leads from the armature winding are soldered to the necks of the commutator bars. There are certain types of machines, however, such as direct-current generators for use on aircraft, in which high capacity is required but in which the size and weight of the machine must be kept small. Such machines, therefore, must be capable of delivering relatively large currents for their physical size, and certain parts of such machines may reach rather high temperatures in service. The highest-melting-point solders which are available have melting points in the neighborhood of 300° C., and it has been found that the commutators of aircraft generators and similar machines sometimes reach temperatures in service which are high enough to cause such solder to soften sufficiently to cause loosening and eventual failure of soldered connections of the armature leads to the commutator bars.

In order to overcome this difficulty, it is necessary to braze the armature leads to the commutator bar necks. Brazing alloys suitable for this purpose have melting points in the neighborhood of 570° C., which is high enough to produce a reliable connection which will not become softened or loosened even under the severe conditions of service encountered in aircraft generators. The use of such high-melting-point alloys, however, introduces a difficult problem in making the brazed connections to the commutator bars. In the conventional construction of direct-current machines, two leads from the armature winding are connected to each commutator bar, one of these leads coming from a coil side which lies in the bottom of a slot, and the other one coming from a coil side which lies in the top of a different slot. Thus, the two leads connected to each commutator bar come from the armature winding at different levels, and they are customarily placed one above the other in a slot in the commutator bar neck and secured therein.

When it is attempted to braze the leads to the neck in this position, no difficulty is encountered in making a good connection of the top lead to the neck, but the bottom lead is closely adjacent to the commutator bar itself, which has a relatively large mass as compared to that of the neck, and the heat flows away from the neck into the bar so that it is extremely difficult to raise the lower portion of the neck to a high enough temperature to cause the brazing alloy to flow in the slot and form a good connection. This effect causes poor joints between the lower conductors and the commutator bar necks which tend to become loosened in service and result in an open circuit. If sufficient heat is applied during the brazing operation to insure that the brazing alloy will flow to the bottom of the slot to form a good connection between the lower conductor and the commutator bar neck, then the temperature of the commutator bar itself is likely to become high enough to cause annealing or softening of the commutator bar, which is customarily made of hard-drawn copper, or the temperature may even become high enough to scorch or damage the mica insulation between adjacent commutator bars, resulting in loosening up of the entire commutator, which of course is not permissible. Thus, the brazing of the armature leads to commutator bar necks presents a rather difficult practical problem.

The principal object of the present invention is to provide an armature construction for dynamo-electric machines which will permit the armature leads to be brazed to the commutator bar necks to form a strong and reliable joint without causing excessive heating of the commutator bars themselves.

A further object of the invention is to provide an armature construction in which the armature leads which are connected to each commutator bar neck are so arranged that they can be simultaneously brought to the necessary temperature for brazing without causing the temperature of the commutator bar itself to rise excessively.

A more specific object of the invention is to provide an armature construction in which the relative position of the two leads connected to each commutator bar neck is changed so as to place them side by side in a slot in the neck, so that they can be simultaneously brazed in position, and in which this change in the relative position of the leads is effected in the shortest possible space so as to avoid increasing the length of the armature over that of the conventional construction.

The invention will be more fully understood from the following detailed description, taken in connection with the accompanying drawing, in which:

Figure 1 is a partial longitudinal sectional view of an armature embodying the present invention;

Fig. 2 is a fragmentary developed plan view of the armature of Fig. 1;

Fig. 3 is a view, partly in section on the line III—III of Fig. 1, showing one commutator bar neck;

Fig. 4 is a perspective view of a typical armature coil;

Fig. 5 is a plan view of a single commutator bar neck and associated leads showing a modification of the invention;

Fig. 6 is a fragmentary sectional view approximately on the line VI—VI of Fig. 5; and Fig. 7 is a somewhat diagrammatic view illustrating a preferred method of carrying out the invention.

As pointed out above, it is extremely difficult to satisfactorily braze the armature leads to a commutator bar neck when using the conventional armature construction in which the two leads are placed one above the other in a slot in the neck. According to the present invention, this difficulty is avoided by placing the two leads side by side in the slot in the commutator bar neck so that both leads are in approximately the same position with respect to the bar itself as the upper lead alone was in the conventional construction of the prior art. Thus, in brazing the leads to the neck, the temperature at the top of the neck can be raised high enough to melt the brazing alloy and obtain a strong and reliable joint without raising the temperature of the commutator bar itself to the point where harmful effects would occur in the bar or the mica insulation between bars. In this way, a strong and reliable joint can readily be produced which will not fail in service even under the severe conditions encountered in aircraft generators and similar small machines of large capacity.

Figs. 1, 2 and 3 show a typical armature construction using the arrangement of the present invention. As shown in these figures, the armature may consist of a laminated armature core 1 of any suitable or usual construction mounted on a shaft 2 in the usual manner. The armature winding may be of any suitable type and may consist of a plurality of coils 3 placed in slots 4 in the periphery of the armature core 1. The armature also includes a commutator consisting of a plurality of copper bars 5 having substantially radial necks 6 at one end thereof, and separated by sheets of mica or other suitable insulation 7. The commutator bars may be clamped between V-rings 8 and 9 mounted on the shaft 2 in any desired manner and insulated from the commutator bars by mica V-rings 10.

Fig. 4 shows a typical armature coil 3 such as may be used in carrying out the present invention. This coil has one coil side 11 which is adapted to be placed in the top of one of the slots 4 of the armature core, and another coil side 12 which is adapted to be placed in the bottom of a different slot 4. The coil sides 11 and 12 have extending leads 13 and 14, respectively which extend out beyond the armature core and are intended to be connected to the commutator bars. In the conventional construction as used in the prior art, both of these leads 13 and 14 would extend straight out from the core to the commutator and the lead 13 would be placed in the top of a slot in one commutator bar neck 6 while the lead 14 would be placed in the bottom of the slot of another neck 6. As explained above, however, this construction makes it extremely difficult, if not impossible, to produce a satisfactory brazed joint between the bottom leads 14 and the commutator bar necks. In accordance with the present invention, therefore, the lead 14 of each of the armature coils 3 is bent upward, as indicated at 15, at a point close to the commutator. The commutator bar necks 6 have slots 16 cut in them which are wider than in the conventional construction so as to accommodate two leads side by side, and the bottom of the slot is cut at an angle as shown in Fig. 1, to accommodate the bent-up lead 14.

In assembling the armature, the two leads which are to be attached to each commutator bar will consist of an upper lead 13 of one coil 3 and a lower lead 14 of a different coil 3. The lead 14 is bent upward as indicated at 15, and the two leads are placed side by side in the slot 16. The leads are then brazed to the neck 6, using a suitable brazing alloy which can readily be brought to the necessary temperature to form a strong and reliable connection which will not fail in service. Since both leads are connected to the neck near its upper end and relatively remote from the large mass of the commutator bar 5, there is little tendency for a large amount of heat to flow into the bar during the brazing operation and no difficulty is encountered in raising the temperature of the brazing alloy sufficiently to completely melt it without causing an excessive temperature of the commutator bar itself. The lower lead 14 is bent upwardly at a point close to the commutator so that the length of the armature is not increased and there is no interference between the leads.

In some cases in relatively small machines, the commutator bars 5 and necks 6 may be too narrow to permit the two leads 13 and 14 to be placed side by side in a slot as in Fig. 3. In such cases, the ends of the leads which are to be placed in the slot 16 may be flattened as shown at 17 and 18 in Figs. 5 and 6 so as to reduce their thickness so that they can be placed side by side in a slot which will not be too wide for the thickness of the commutator bar neck. Since armature coils are customarily made of relatively soft and ductile copper, this flattening of the ends of the leads can easily be carried out by applying sufficient pressure to the ends of the leads in a suitable die. The flattened ends of the leads will of course be of somewhat greater width, as shown in Fig. 6, necessitating a relatively deeper slot 16, but this will have no effect on the reliability of the brazed connection.

The actual brazing operation may, of course, be carried out in any suitable manner, but a preferred method for effecting this operation is shown diagrammatically in Fig. 7. As shown in this figure, the energy required for the brazing operation is provided by a transformer 20 which has its primary winding connected to a suitable source of electrical energy. One end of the secondary winding of the transformer 20 is connected to a copper brush 21, which is placed in contact with the commutator bar 5 on which the brazing operation is to be performed, while the other end of the secondary winding is connected to a carbon rod 22. The brazing alloy may be supplied from a rod 23 which can be made long enough to be held in the hand of the operator and inserted manually in the slot of the neck 6 after the leads 13 and 14 have been put in place, or the brazing alloy may be placed in the slot in the form of a thin strip or ribbon before the leads are put in place. When the carbon rod 22 is then moved into contact with the neck 6, a circuit is completed from the transformer 20, and the current flowing through the carbon rod 22 heats it to the point where it becomes incandescent and radiates a large amount of heat. The heat from the carbon rod is transmitted to the brazing rod 23, both by radiation from the carbon and by conduction through the copper neck and leads, bringing the copper up to brazing temperature and causing the end of the rod to melt so that the brazing alloy runs down between the leads and the sides of the slot 16 in which they are placed, and substantially fills the top of the slot. A stream of water 24 may be directed on to the commutator from a pipe 25 during the brazing operation to prevent the copper commutator bars from becoming too hot. The armature may be mounted in a suitable fixture which permits it to be rotated, and the brazing operation as described above can then readily be repeated on each successive commutator bar neck completely around the armature. Excess brazing metal can then be removed, if necessary, by turning in a lathe, or in any other suitable manner.

It should now be apparent that an armature construction has been provided which makes it possible to braze the armature leads to the necks of the commutator bars, thus permitting the use of brazed connections, which are permanent and reliable even though the temperature rise of the machine may be quite high in service. The use of brazed joints for the connections between the armature leads and the commutator bars permits the design of smaller and lighter machines for a given load capacity, which is an essential requirement for generators for such applications as aircraft, and other applications where the size and weight of the machine must be kept as small as possible.

It will be apparent that although a specific embodiment of the invention has been shown and described, various modifications might be made without departing from the spirit of the invention, and that although a preferred method of carrying out the brazing operation has been shown, other methods, such as simultaneously heating all of the leads by high-frequency induction heating, might also be used. It is to be understood, therefore, that the invention is not limited to the specific embodiment shown and described for the purpose of illustration, but that in its broadest aspects it includes all equivalent modifications and embodiments which come within the scope of the appended claims.

I claim as my invention:

1. In a dynamo-electric machine of small size and high capacity, a slotted armature member having a winding in the slots thereof, a commutator comprising a plurality of axially extending bars having radial necks at one end thereof, said armature winding having a plurality of leads adapted to be connected to said commutator bar necks, each of said necks having two of said leads connected thereto, the two leads connected to each commutator bar neck coming from the top of one slot of the armature member and from the bottom of another slot, respectively, and being disposed side by side in a slot in the neck, and a mass of a brazing alloy in said slot joining the leads to the commutator bar neck.

2. In a dynamo-electric machine of small size and high capacity, an armature member having a winding thereon, a commutator comprising a plurality of axially extending bars having radial necks at one end thereof, said armature winding having a plurality of leads adapted to be connected to said commutator bar necks, each of said necks having two of said leads connected thereto, the two leads connected to each commutator bar neck being arranged one above the other as they come from the armature and being disposed side by side in a slot in the neck, and a mass of a brazing alloy in said slot joining the leads to the commutator bar neck.

3. In a dynamo-electric machine of small size and high capacity, an armature member having a winding thereon, a commutator comprising a plurality of axially extending bars having radial necks at one end thereof, said armature winding having a plurality of leads adapted to be connected to said commutator bar necks, each of said necks having two of said leads connected thereto, the two leads connected to each commutator bar neck being arranged one above the other as they come from the armature, the lowermost of said leads being bent upwardly at a point near the commutator bar neck to which it is connected, and the two leads being disposed side by side in a slot in said neck, and a mass of a brazing alloy in said slot joining the leads to the commutator bar neck.

4. In a dynamo-electric machine of small size and high capacity, an armature member having a winding thereon, a commutator comprising a plurality of axially extending bars having radial necks at one end thereof, said armature winding having a plurality of leads adapted to be connected to said commutator bar necks, each of said necks having a slot therein and having two of said armature leads connected thereto, the two leads connected to each commutator bar neck being arranged one above the other as they come from the armature, the lowermost of said two leads being bent upward at a point near the commutator and the two leads being disposed side by side in the slot of the neck, and a mass of a brazing alloy in the slot of each commutator bar neck joining the leads to the neck.

5. In a dynamo-electric machine of small size and high capacity, an armature member having a winding thereon, a commutator comprising a plurality of axially extending bars having radial necks at one end thereof, said armature winding having a plurality of leads adapted to be connected to said commutator bar necks, each of said necks having a slot therein and having two of said armature leads connected thereto, the two leads connected to each commutator bar neck being arranged one above the other as they come from the armature, the lowermost of said two leads being bent upward at a point near the commutator and the two leads being disposed side by side in the slot of the neck, the ends of said leads lying in said slot being of reduced thickness, and a mass of a brazing alloy in the slot of each commutator bar neck joining the leads to the neck.

FREDERICK R. J. DAVIS.